United States Patent [19]
Chown et al.

[11] 4,225,753
[45] Sep. 30, 1980

[54] DATA TRANSMISSION SYSTEMS

[75] Inventors: Martin Chown, Harlow; Jeffrey G. Farrington, Bishop's Stortford, both of England

[73] Assignee: International Standard Electric Corporation, New York, N.Y.

[21] Appl. No.: 929,766

[22] Filed: Jul. 31, 1978

[30] Foreign Application Priority Data

Aug. 2, 1979 [GB] United Kingdom ............... 32389/77

[51] Int. Cl.² .............................................. H04J 3/08
[52] U.S. Cl. ........................................ 370/4; 370/13; 370/86
[58] Field of Search ....................... 179/15 AL, 15 BF

[56] References Cited

U.S. PATENT DOCUMENTS

| | | | |
|---|---|---|---|
| B 497,293 | 3/1976 | Mattern | 179/15 AL |
| 3,600,518 | 8/1961 | McNeilly | 179/15 AL |
| 3,600,519 | 8/1971 | McNeilly | 179/15 AL |
| 3,652,798 | 3/1972 | McNeilly | 179/15 AL |
| 4,079,209 | 3/1978 | Schwerdtel | 179/15 BA |

*Primary Examiner*—David L. Stewart
*Attorney, Agent, or Firm*—John T. O'Halloran; Alfred C. Hill

[57] ABSTRACT

In a closed-loop multiple data terminal data transmission system, each message includes in addition to a message portion, a prefix portion having at least the address of the terminal for which the message is intended. When such a message reaches a data terminal its address is checked, and if not for that terminal, the prefix and the message portions are repeated along the loop. If the message is for the terminal only the prefix is repeated along the loop, the message portion being retained at the intended terminal. The prefix with no attached message eventually reaches the originating data terminal where its arrival indicates that the message has reached its destination and that the loop is intact.

5 Claims, 2 Drawing Figures

DATA TRANSMISSION SYSTEMS

BACKGROUND OF THE INVENTION

The present invention relates to data transmissions systems of the closed-loop type, also known as "ring-main" systems.

In such systems it is desirable that a station which originates a message to another station should "know" whether that message has reached its intended destination, and it is also desirable for any break of the loop to be readily detectable.

SUMMARY OF THE INVENTION

This invention seeks to provide a data transmission system in which system security, as referred to above, is enhanced.

According to the present invention there is provided a data transmission system which includes a number of data terminals each of which includes receiving means and transmitting means, and transmission links interconnecting the terminals such that the system is a closed-loop system, wherein each message which is sent over the system includes in addition to the message portion, a prefix portion including at least the address of the terminal for which the message is intended, wherein each of the terminals include address responsive means which compares the address in the prefix portion of each received message with the address of its own data terminal, wherein when the address responsive means detects that the message is for its own data terminal it causes that message's prefix portion to be re-transmitted along the loop and the message portion to be retained in the data terminal wherein when the address responsive means finds that the message is not for its own data terminal it causes the prefix portion and the message portion of that message to be re-transmitted along the loop, and wherein the reception at the station which originated that message of the message prefix but not the message portion indicates that the message has been received and that the loop is intact.

The invention is applicable to electrical data transmission systems, but the specific embodiment described in the present specification is one in which the data transmission links are optical fibres.

BRIEF DESCRIPTION OF THE DRAWING

In the accompanying drawing

DESCRIPTION OF THE PREFERRED EMBODIMENT

Figure 1:
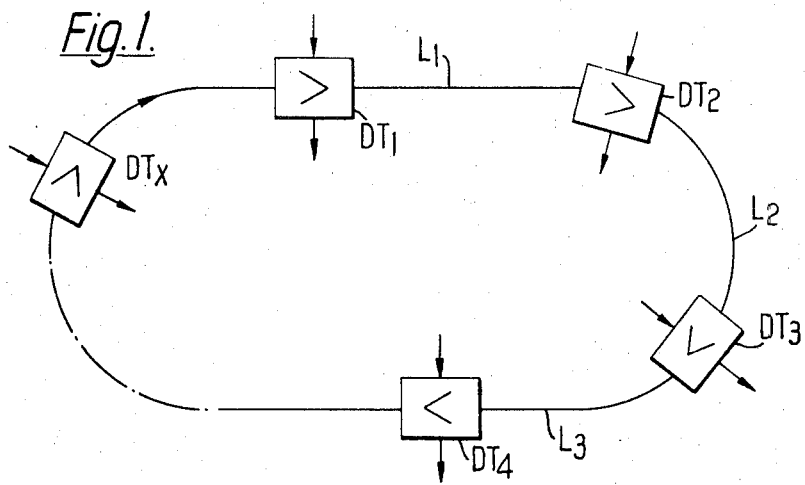
FIG. 1 is a highly schematic representation of a closed loop data transmission system to which the invention is applicable.

The system shown in FIG. 1. includes a number of data terminals DT1, DT2, . . . etc., interconnected by links L1, L2 . . . etc., which in the system described are optical fibre links. However, as mentioned above, the invention is applicable to more conventional systems in which the transmission is electrical, e.g. over coaxial cable links. Each data terminal has a message input and a message output, these inputs and outputs being represented in FIG. 1. by arrowed lines.

The system functions on a time-divided basis in that each data terminal has its turn to have complete use of the system. During a data terminal's turn, which occurs once in each time frame of the system, that terminal can transmit a message to any one of the other data terminals. Such a message consists of a prefix portion and a message portion. A message prefix portion includes the address of the data terminal for which the message is intended, plus such service data as the system uses, this service data includes the address of the terminal which originated the message plus synchronization control information.

Figure 2:
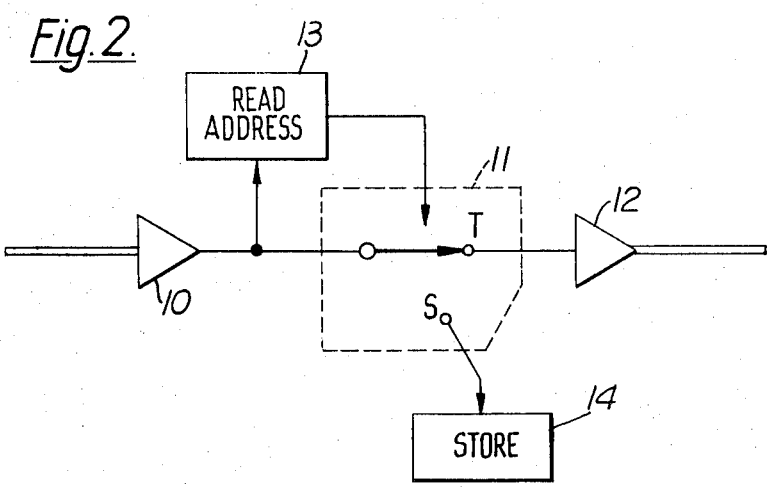
FIG. 2 is a highly schematic representation of one of the data terminals used in the system of FIG. 1.

Each of the data terminals, see FIG. 2, includes an optical receiving arrangement 10 which receives incoming information in optical form and converts it into electrical information for use within the terminal. This conversion is effected, for instance, by a photo-diode at which the optical fibre terminates, followed by a pre-amplification and pulse-shaping stage. The output of the arrangement 10 passes via a switching arrangement 11, which is electronic in nature although shown for simplicity as a mechanical switch, to an optical transmission arrangement 12. This latter consists, for instance, of a light emitting diode or laser whose output is applied to the optical fibre, this output being modulated in accordance with what is to be re-transmitted. In addition the output of arrangement 10 passes to an address responsive circuit 13 which compares the destination address in the message's prefix portion with its own terminal's address, to determine whether the message is intended for its own terminal.

If the circuit 13 determines that the message is not intended for its own data terminal, it takes no action, so that the switching arrangement 11 is left in the condition shown, so that the message portion also passes to the transmission arrangement 12. Note that the prefix portion will already have passed to the arrangement 12, and this will have been re-transmitted. Hence, in this case the entire message, i.e. prefix portion and message portion, is re-transmitted when the message is not intended for the data terminal. Thus, as "seen" by the rest of the system, the data terminal in this case merely acts as a repeater.

If the address responsive circuit 13 determines that the message is intended for its own data terminal it actuates switching arrangement 11 to its S setting in which case the message portion enters a store 14. Note that this switching takes place after the prefix portion has passed via the switching arrangement 11 to the transmission arrangement 12. Thus, in this case the data terminal only re-transmits the prefix portion, for which of course it acts as the repeater. The message portion after it has been received in the store 14, is dealt with in a manner appropriate to the message, for instance, in the manner described in our copending U.S. application Ser. No. 804,686, filed June 7, 1977.

The prefix portion of the message thus re-transmitted without a message portion eventually reaches the originating data terminal, where it is detected by that terminal's address responsive circuit. This detection is possible since as mentioned above the prefix portion contains the originating terminal's address as well as the destination address. Both of the addresses are in fact checked against the terminal's own address, and the response to an address identified as that of the terminal at which the message originated differs from the response to its address as the destination of the message. When a terminal receives its own address as the originating address in the prefix portion, the terminal "knows" that the message has been dealt with and that the loop is intact. In this case of course, the message portion is not present. When this occurs, a signal is produced to indicate that the message has been correctly dealt with.

If the prefix portion fails to return after a pre-set time, or returns with its message portion still attached an alarm is given to indicate the fault condition.

The system thus far described is one in which the data terminals are of equal status, but the invention can also be used where one of the terminals is a master station which exercises a controlling influence on the system. Such influence could include the provision of bit synchronisation for the data terminals.

What is claimed is:

1. A data transmission system comprising:
    a plurality of data terminals; and
    transmission links interconnecting said terminals to form a closed loop data transmission system;
    each of said terminals including
        receiving means coupled to an associated one of said link to receive a message having a message portion and a prefix portion including at least an address of that one of said terminals for which said message is intended,
        transmitting means coupled to another associated one of said link to transmit at least said prefix portion,
        an address responsive means coupled to said receiving means to compare said address in said prefix portion of each received message with the address of its associated one of said terminals and to produce a control signal only when said address in said prefix portion of each received message is the address of its associated one of said terminals, and
        switching means coupled to said receiving means and said address responsive means and selectively coupled to said transmitting means, said switching means responding to the presence of said control signal to couple said prefix portion producing said control signal to said transmitting means for transmission to that one of said terminals originating said message containing said prefix portion producing said control signal and to couple said message portion of said message containing said prefix portion producing said control signal to a storage means for processing in the associated one of said terminals and said switching means responding to the absence of said control signal to couple both said prefix portion and said message portion of said message not intended for the associated one of said terminals to said transmitting means for transmission of both portions of said message to the next succeeding one of said terminals,
    whereby reception of only said prefix portion at that one of said terminals originating said message indicates that said message has been received and that said closed-loop system is intact and whereby failure of that one of said terminals originating said message to receive only said prefix portion after a pre-set time, or said prefix portion is received with its message portion attached indicates a system fault.

2. A system according to claim 1, wherein said system employs electrical techniques and said links are metallic conductors.

3. A system according to claim 1, wherein said system employs optical techniques and said links are optical fibers.

4. A system according to claim 1, wherein said system operates in a time-divided manner with each of said terminals being allotted a particular different time slot of a system time frame in which it and it alone can operate.

5. A system according to claim 1, wherein said prefix portion further includes
    an address of that one of said terminals originating said message to enable this one of said terminals to determine if said message has been received and said closed loop system is intact, or if a system fault is present.

* * * * *